United States Patent Office 3,450,641
Patented June 17, 1969

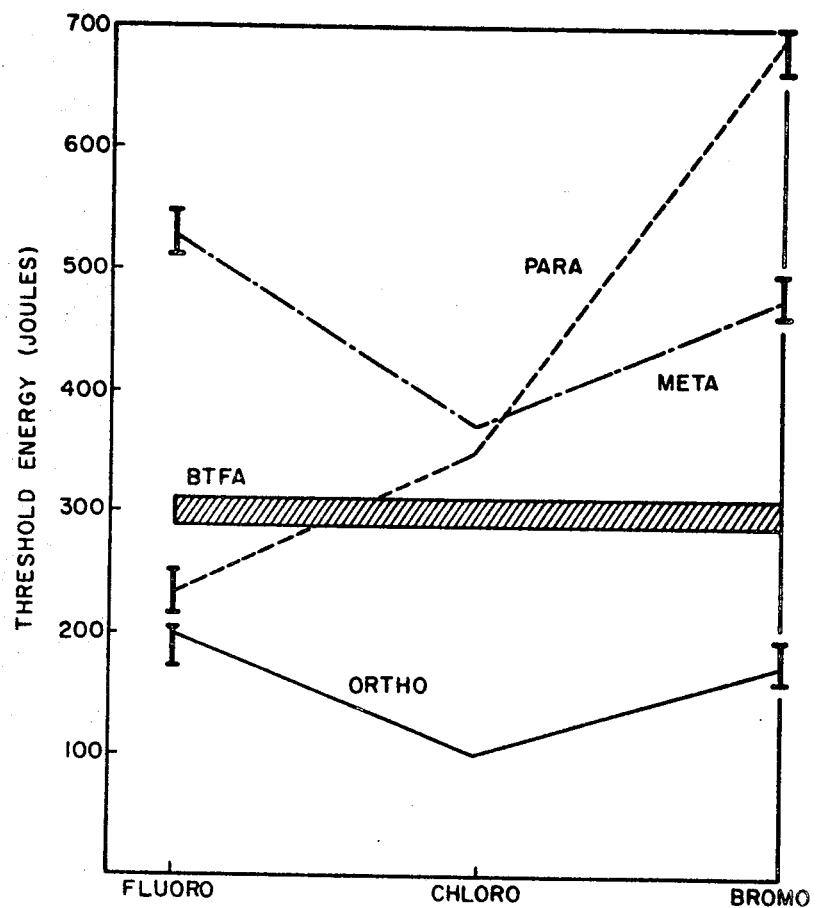
INVENTORS
ERHARD J. SCHIMITSCHEK
RICHARD B. NEHRICH
BY JOHN A. TRIAS
ATTORNEYS

3,450,641
SUBSTITUTE EUROPIUM CHELATES FOR
LIQUID LASER OPERATION
Erhard J. Schimitschek and Richard B. Nehrich, Jr., San Diego, and John A. Trias, La Mesa, Calif., assignors to the United States of America as represented by the Secretary of the Navy
Filed Oct. 31, 1966, Ser. No. 591,376
Int. Cl. C09k 1/02; F21k 2/00
U.S. Cl. 252—301.2                 5 Claims The invention described herein may be manufactured and used by or for the Government of the United States of America for governmental purposes without the payment of any royalties thereon or therefor.

The present invention relates to lasing solutions and, in particular, provides new solutions formed by substituting halogens into the ortho, meta and para positions of europium benzoytrifluoroacetonate.

As has been demonstrated in our copending patent application, Ser. No. 418,358, filed Dec. 14, 1964, now U.S. Patent No. 3,360,478 tetrakis europium (III) benzoytrifluoroacetonate (BTFA), prepared with different bases, presents significant advantages for use as a liquid laser medium. Also, as described in our copending patent application Ser. No. 399,944, filed Sept. 28, 1964, now abandoned, as well as in other published literature, the laser threshold of this particular material has proven to be dependent upon its preparation with special bases such as the anhydrous amine bases. The present invention utilizes and extends these teachings in manners which will be described in detail.

One significant concern in the technical field of liquid laser research is the desirability of producing a lasing solution capable of stimulated emission or laser action at temperatures approximating room temperature. As will be appreciated, such a room-temperature laser then can be recirculated through heat exchanger mechanisms so as to permit a substantially continuous emission due to the re-use of the same solution after its temperature has been reduced in the heat exchanger. The disclosure of previously-mentioned patent application Ser. No. 418,358 primarily has been directed toward such a development and, as there described, such solutions are achievable by providing a solution formed of a fluorinated europium chelate dissolved in acetonitrile.

A further related advantage of these solutions is that their threshold energy in joules, or, in other words, the minimum energy required to produce stimulated emission, varies with variations in operating temperatures to the extent that the threshold energies are found to be relatively low when the operating temperature approximates that of room temperature which, for purposes of definition, can be considered to be between −40° C. to +35° C. Obviously, low threshold energy requirements are most desirable.

A further consideration is the desirability of achieving laser action in solutions having substantial volume. The use of large volumes is important since the intensity of the emission increases in proportion to the amount of liquid which can be caused to lase.

The present invention has as one of its primary objectives the extension of previous findings relating to room-temperature liquid lasing solutions by investigating and providing new lasing solutions exhibiting characteristics similar to those already demonstrated.

A more specific object is to provide a liquid lasing solution having the lowest possible threshold energy requirements at operating temperatures within the range of about −40° C. to +35° C. Correlative to this particular object, a further object is to provide lasing solutions in which the intensity of the stimulated emission is improved due to the feasibility of producing the emissions in larger volumes of the solution.

These and other objects which will become apparent are achieved generally by forming the lasing liquid from a mono-substituted benzoytrifluoroacetone ligand, the substituents in the ligand being selected from a group of halogens consisting of chlorine, bromine and fluorine and the substitutions preferably being made in the benzene ring of the ligand in the ortho, meta or para positions.

The single figure of the drawing is a plot illustrating certain important characteristics of the presently contemplated solutions.

The substituted BTFA ligands from which the present chelates are formed may be prepared by conventional procedures reported in the published literature by J. Reid and M. Calvin, Journal of the American Chemical Society 72, 2948 (1950). According to these procedures, the corresponding methyl ketones, are condensed with ethyl trifluoroacetate and the beta-diketones then were obtained by steam distillation. Thus, in the present work, o-, m-, and p-fluoroacetophenones, chloroacetophenones and bromoacetophenones were purchased commercially and, after condensation, then used without further purification by recrystallization. To assure the validity of the results, a carbon and hydrogen analysis was made and the experimental data derived from the analysis verified by comparison with calculated data as shown in the following Table I.

TABLE I.—SUBSTITUTED BTFA LIGANDS

| Substituted BTFA | Percent C | | Percent H | | M.P., ° C. |
|---|---|---|---|---|---|
| | Calculated | Experimental | Calculated | Experimental | |
| o-Fluoro-BTFA | 51.3 | 51.0 | 2.56 | 2.55 | 27–29 |
| m-Fluoro-BTFA | 51.3 | 51.0 | 2.56 | 2.42 | 41–43 |
| p-Fluoro-BTFA | 51.3 | 50.8 | 2.56 | 2.64 | 41–43 |
| o-Chloro-BTFA | 47.9 | 48.1 | 2.39 | 2.57 | (¹) |
| m-Chloro-BTFA | 47.9 | 48.4 | 2.39 | 2.40 | 42–44 |
| p-Chloro-BTFA | 47.9 | 48.5 | 2.39 | 2.31 | 59–61 |
| o-Bromo-BTFA | 40.6 | 40.4 | 2.03 | 2.21 | (²) |
| m-Bromo-BTFA | 40.6 | 40.7 | 2.03 | 2.13 | 45–47 |
| p-Bromo-BTFA | 40.6 | 41.0 | 2.03 | 2.14 | 59–61 |

¹ Pale yellow liquid $n_D$ at 25° C. = 1.526.
² Yellowish liquid $n_D$ at 25° C. = 1.541.

Using the nine substituted ligands, as well as plain BTFA, the dimethylammonium salts of the tetrakis europium (III) chelates were prepared also in a conventional manner described in the literature by M. Bhaumik et al., Journal of Physical Chemistry 68, 1490 (1964). For comparison purposes, the dimethylammonium salt of plain or unsubstituted BTFA was prepared along with the other nine substituted ligands, the plain BTFA serving as a known norm.

In the preparation of the salts, dimethylamine was employed as the base to keep the influence of the base constant, although, as will be recognized by those familiar with this art, other anhydrous amine bases, as well as other similar bases such as caesium hydroxide, etc., can be substituted. For reasons stated in our copending patent application, Ser. No. 399,496, now U.S. Patent No. 3,388,071, the use of an anhydrous amine base is preferred.

In preparing the salts, a 1:4:4 molar mixture of $EuCl_3 \cdot 6H_2O$, ligand and anhydrous dimethylamine was prepared in 99% ethanol and, after slow evaporation of the solvents, the chelates were obtained as well-defined yellow crystals which then were subjected to filtering and careful washing with ethanol before being air-dried for subsequent analytical and experimental purposes. The following Table II provides the results of a carbon and hydrogen chemical analysis of these crystals, as well as their melting points. These results shown in Table II are intended to verify the identity of the prepared crystals.

TABLE II.—EU(III)(LIGAND)₄DMA

| Ligand | Percent C Calculated | Percent C Experimental | Percent H Calculated | Percent H Experimental | M.P., °C. |
|---|---|---|---|---|---|
| BTFA | 47.6 | 47.6 | 3.03 | 3.31 | 180–181 |
| o-Fluoro-BTFA | 44.6 | 44.7 | 2.48 | 2.70 | 115–115 |
| m-Fluoro-BTFA | 44.6 | 45.0 | 2.48 | 2.80 | 129–130 |
| p-Fluoro-BTFA | 44.6 | 45.0 | 2.48 | 2.80 | 164–165 |
| o-Chloro-BTFA | 42.1 | 42.2 | 2.34 | 2.74 | 194–195 |
| m-Chloro-BTFA | 42.1 | 42.2 | 2.34 | 2.50 | 124–125 |
| p-Chloro-BTFA | 42.1 | 42.5 | 2.34 | 2.74 | 196–197 |
| o-Bromo-BTFA | 36.7 | 37.6 | 2.04 | 2.30 | 181–182 |
| m-Bromo-BTFA | 36.7 | 37.4 | 2.04 | 2.53 | 134–135 |
| p-Bromo-BTFA | 36.7 | 37.2 | 2.04 | 2.40 | 206–207 |

The crystalline materials obtained from the foregoing preparations were used for all of the laser experiments as well as the spectroscopic measurements and other data relative to their physical and chemical characteristics. The solvent for the crystals was acetonitrile, analyzed reagent grade. Other solvents conceivably could be employed but, insofar as the purposes of the present invention is concerned, a primary objective is to obtain room-temperature lasing action and, according to previously-referenced teachings acetonitrile is a significant factor in the production of such lasing solutions.

In analyzing the laser action of the substituted chelates, conventional laser cells, including the cell described in a copending patent application of Schimitschek and Schumacher, Ser. No. 329,593, filed Dec. 10, 1963, may be employed. However the present experimentation was performed in a simplified and more versatile laser cell.

The principal advantage of this simplified laser cell is to enable a change in the diameter of the lasing liquid and also to permit a constant recirculation of the liquid. The cell itself is formed of a Pyrex tube 135 mm. long 6.3 mm. I.D. into the ends of which are fitted spherical mirrors of 125 mm. radius. The mirrors are coated with a dielectric film of 98% reflectivity at the laser wavelength and inside the 6.3 mm. I.D. Pyrex tube can be placed Pyrex inserts of varying diameter. In the present experiments, inserts successfully used had I.D. of .75, 1.5, 2.5, and 4.0 mm., respectively, these inserts being sealed against the outer 6.3 mm. tube with silicon O-rings. The spacing between the insert and the outer tube is used to recirculate cooling or filter solution although, for present analytical purposes, recirculation was not employed.

The laser liquid was $7.5 \times 10^{-3}$ M solution of the respective europium chelate in acetonitrile and, in the experimentation, it was recirculated through the cell and through an external heat exchanger by a small centrifugal pump. To keep variations in the flow rate small, the pump was operated between 2,000 and 3,000 r.p.m. and a 5 micron filter was placed in the flow line to retain scattering particles. The heat exchanger consisted simply of a helical glass coil through which the liquid traveled and which, in turn, was immersed in a controlled temperature bath. Thermocouples at the inlet and outlet ends registered the temperature of the lasing liquid. The flow rate was continuously controlled up to about 2 ml./sec., which in the most frequently used 1.5 mm. insert corresponds to a liquid velocity along the insert of about 100 cm./sec. This laser cell was placed inside an elliptical head generally described in a published article by Schimitschek and Lewis, Review of Scientific Instrument 35, 911 (1964).

Using this laser cell, it was found that stimulated emission could be obtained at room temperature (21° C.) for all of the ten prepared chelates listed in the foregoing Table I, these chelates, as already has been stated, having been dissolved in acetonitrile at a concentration of $7.5 \times 10^{-3}$ M. In each case, laser action was accompanied by the appearance of an intense bright spot located in the center of the fluorescence, and also by spiking and line narrowing. The laser wavelength of the different chelates are compiled in the following Table III which, it further may be noted, contains information regarding the relative quantum efficiency, the linewidth and the relative threshold energy requirements. The wavelengths obviously are not appreciably effected by the substituent, the largest difference being 1.1 A. between ortho- and meta-fluoro-BTFA.

TABLE III.—MATERIAL PARAMETERS IN SOLUTION ($7.5 \times 10^{-3}$ M IN ACETONITRILE)

| Eu-chelates | Relative Q.E., 21° C. | Linewidth main fluorescence peak, 0° C. | Laser wavelength [A.], 21° C.[1] | Relative threshold, 21° C. |
|---|---|---|---|---|
| BTFA | 1.00 | 31 | 6117.5 | 1.0 |
| o-F-BTFA | .97 | 30 | 6116.7 | .7 |
| m-F-BTFA | 1.00 | 32.5 | 6117.8 | 1.8 |
| p-F-BTFA | 1.00 | 31 | 6117.3 | .9 |
| o-C-BTFA | .85 | 25 | 6117.4 | .5 |
| m-C-BTFA | 1.00 | 32 | 6117.1 | 1.2 |
| p-C-BTFA | 1.00 | 32 | 6177.2 | 1.2 |
| o-Br-BTFA | .76 | 25 | 6117.4 | .6 |
| m-Br-BTFA | 1.00 | 31 | 6117.3 | 1.6 |
| p-Br-BTFA | 1.00 | 32.5 | 6117.1 | 2.3 |

[1] Laser wavelengths are accurate to ±.1 A.
NOTE: Decay times were measured to be 670±20μsec. for all materials.

The threshold energies for the different substituted chelates are shown in Table III as variations from a norm of "one" for BTFA. Also, comparative threshold energies in joules are shown in FIG. 1 plot. The measurements applicable to FIG. 1 were accomplished with the 1.5 mm. insert, the solutions being recirculated at a flow rate of 1.5 ml./sec. at 21° C. Once temperature equilibrium had been established after a few moments of circulation, the threshold energies for the liquid and the stationary one appeared essentially the same. As can be seen in FIG. 1, ortho-substitution decreases the threshold for all three substituents, the minimum being reached with ortho-chloro-BTFA. Meta-substitution increases the threshold in all three cases with m-chloro-BTFA showing the least increase. Para-substitution increases the threshold in the case of chlorine and especially bromine, whereas fluorine shows a slight decrease. By looking at Table III, it becomes evident that the spread in threshold cannot be explained simply by putting the values for line width, decay time and quantum efficiency into the Schawlow-Townes formula and calculating the minimum number of inverted species per unit volume necessary for stimulated emission.

Further considering both Table III and FIG. 1, it is apparent that the ortho-chloro chelate provides a material of low threshold energy requirements relative to the unsubstituted BTFA chelate. Consequently, additional experiments were conducted utilizing this particular chelate. In these experiments, it was found that, without any special optimizing, the threshold could be lowered to 45 joules in a small cylindrical laser head with a FX-38A flash tube, using the ortho-chloro chelate in a .75 mm. cell. It is known that the threshold energy for any particular solution depends heavily on optical pumping efficiency and it thus is apparent that substantially lower threshold values could be obtained with even closer coupling.

Also using the ortho-chloro chelate, mode patterns were obtained for each of the different-diameter laser cells, i.e., the cells having diameters of 1.5, 2.5, 4.0 and 6.3 mm., the last cell being one in which the customary insert was not employed. The mode patterns were well defined in all instances although the patterns grow less defined as the diameter of the cell is increased. However, even in the 6.3 mm. tube, there is clear indication of lasing in the center of the mode pattern, a fact which is somewhat surprising considering the strong absorption of these chelate solutions.

Based upon the foregoing experiments, it appears that the spectroscopic and laser qualities of the BTFA ligands can be favorably influenced by the specific substituents in the ligand. Thus, new lasing solutions having unique and significant characteristics are provided. Using the material with the lowest threshold (europium orthochloro-BTFA), the experimentation further established that a single mode operation in liquids can be achieved and also that stimulated emission in the center of tubes up to 6.3 mm. can be obtained. This fact, in connection with the successful recirculation of the lasing liquid through the cell and the external heat exchanger, makes laser action in larger volumes of liquid feasible.

Obviously many modifications and variations of the present invention are possible in the light of the above teachings. It is therefore to be understood that within the scope of the appended claims the invention may be practiced otherwise than as specifically described.

What is claimed is:

1. A liquid lasing solution comprising a chelate formed of a mono-substituted benzoyltrifluoroacetonate ligand, a europium salt and a base;
   said chelate being dissolved in acetonitrile, and
   said substitutents being selected from the group of halogens consisting of chlorine, bromine and fluorine the substitutions being made in the benzene ring of the ligand and being selectively made in the ortho, meta or para positions of the ring.

2. The liquid lasing solution of claim 1 wherein said chelate is tetrakis europium ortho-chloro benzoyltrifluoroacetone.

3. The liquid lasing solution of claim 1 wherein said base is an anhydrous amine base.

4. The liquid lasing solution of claim 3 wherein said base is anhydrous dimethylamine and said chelate is formed of a 1:4:4 molar mixture of the salt, the base and the ligand, the mixture being prepared in 99% ethanol.

5. The lasing solution of claim 3 wherein the liquid lasing solution consists of a $7.5 \times 10^{-3}$ M solution of the chelate in acetonitrile.

References Cited

UNITED STATES PATENTS 3,360,478   12/1967   Schimitschek et al. __ 252—301.2

OTHER REFERENCES

J. Inorg. Nucl. Chem., 1966, vol. 28, pp. 3005–3018.

TOBIAS E. LEVOW, *Primary Examiner.*

WATSON T. SCOTT, *Assistant Examiner.*

U.S. Cl. X.R.

250—71; 252—301.3; 260—429.2